United States Patent [19]

Windsor

[11] 3,952,783

[45] Apr. 27, 1976

[54] METHOD AND APPARATUS FOR HARVESTING TREES

[76] Inventor: Robert N. Windsor, Cowie Road Aspley, Brisbane, Australia, Q. 4034

[22] Filed: June 19, 1975

[21] Appl. No.: 589,154

[30] Foreign Application Priority Data
Feb. 6, 1975 Australia................. 488/75

[52] U.S. Cl. ............... 144/3 D; 144/2 Z; 144/309 AC
[51] Int. Cl.² ......................... A01G 23/08
[58] Field of Search ............ 144/2 Z, 3 D, 34 R, 144/34 E, 309 AC

[56] References Cited
UNITED STATES PATENTS

| 3,618,647 | 11/1971 | Stuart, Jr. .......... | 144/3 D X |
| 3,643,711 | 2/1972 | Puna .............. | 144/3 D X |
| 3,889,729 | 6/1975 | Pinomaki .......... | 144/3 D |

Primary Examiner—Othell M. Simpson
Assistant Examiner—W. D. Bray
Attorney, Agent, or Firm—Teagno & Toddy

[57] ABSTRACT

A method and apparatus for harvesting trees wherein a first log length bolt is delimbed by a movable delimber with the butt end of the tree clamped to put the tree trunk in tension during delimbing; and additional lengths are delimbed by the movable delimber with the top end of the tree clamped to put the trunk in compression during delimbing. The first log length is delimbed and bucked while the tree is held by the felling head of the harvester apparatus. Subsequent lengths are delimbed and bucked while the tree is held by a stationary clamp assembly. The delimber blades are used as a clamp to maneuver the tree after the first log length has been delimbed and bucked.

15 Claims, 8 Drawing Figures

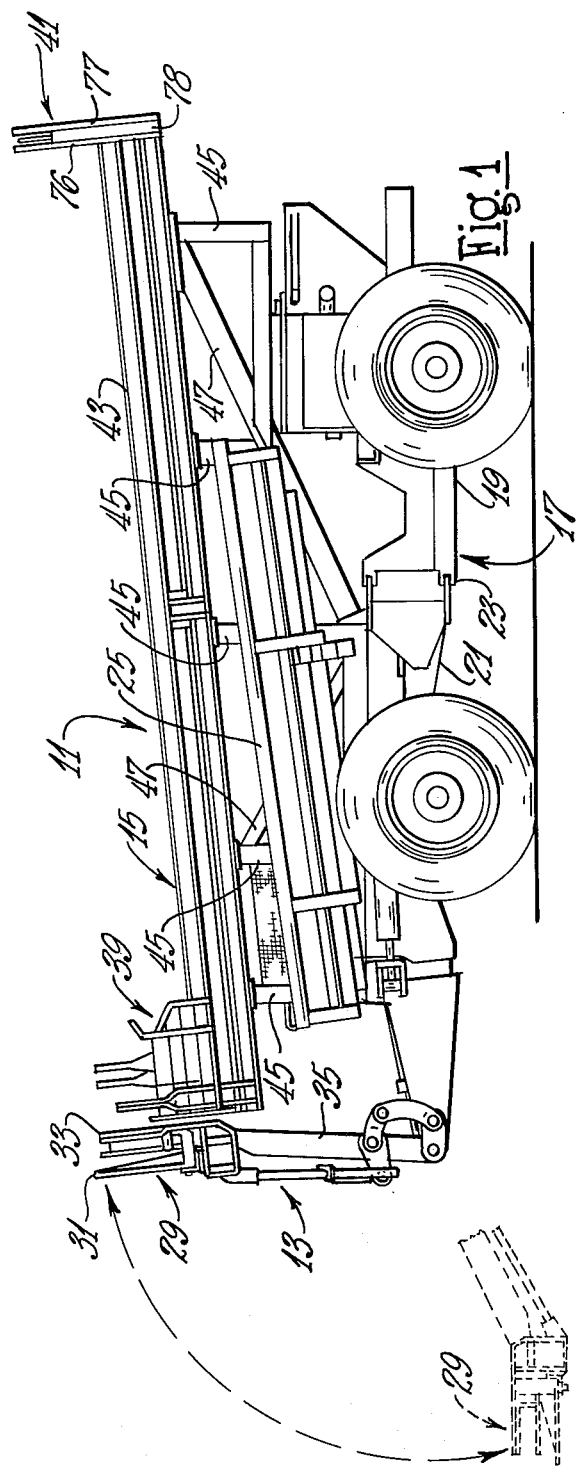
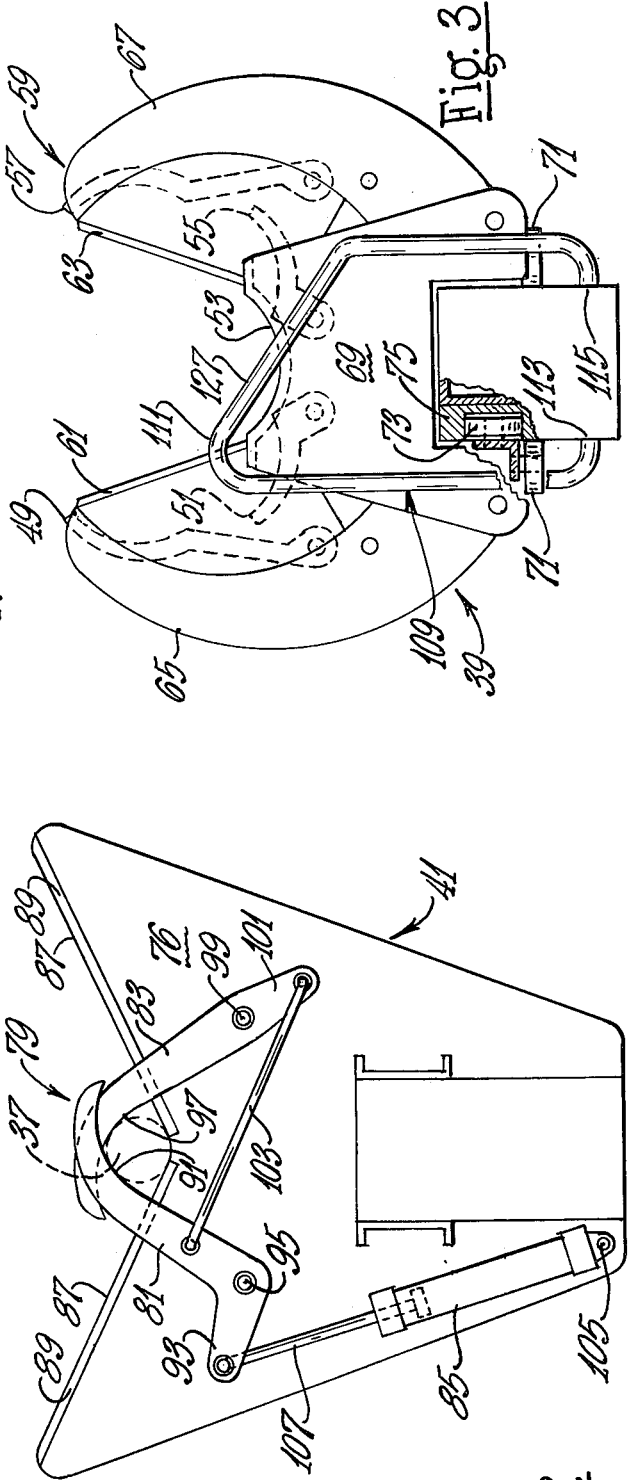

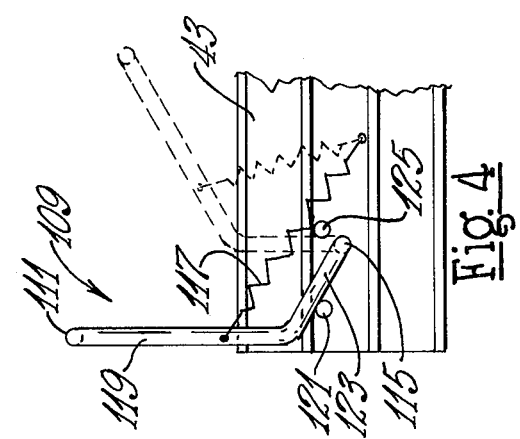
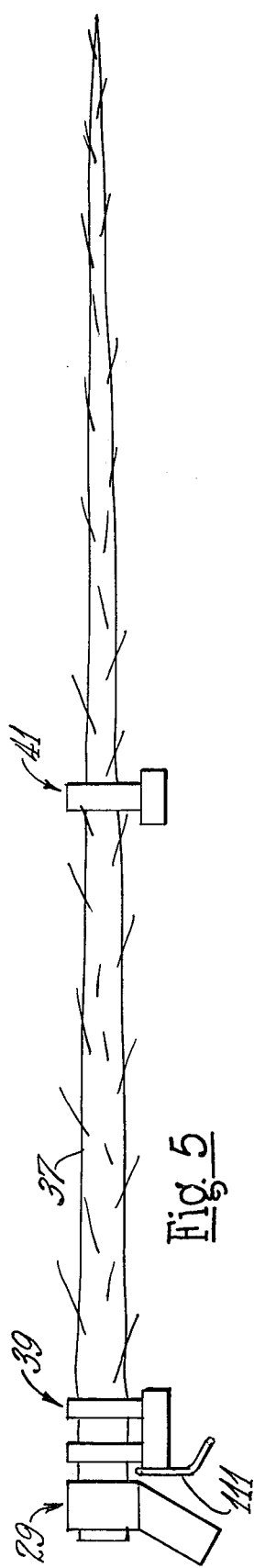
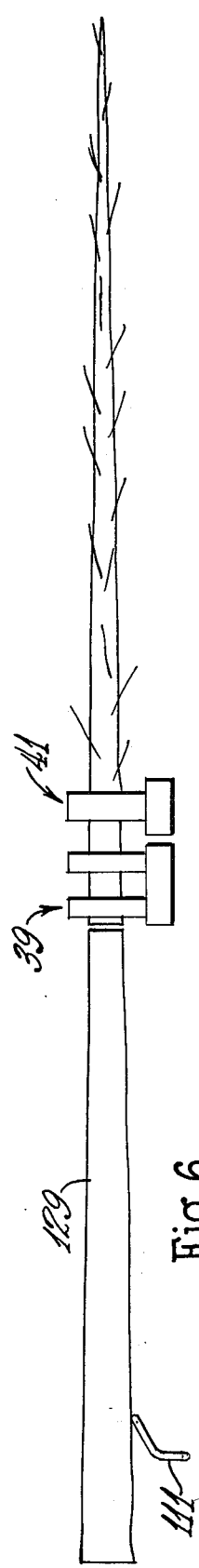
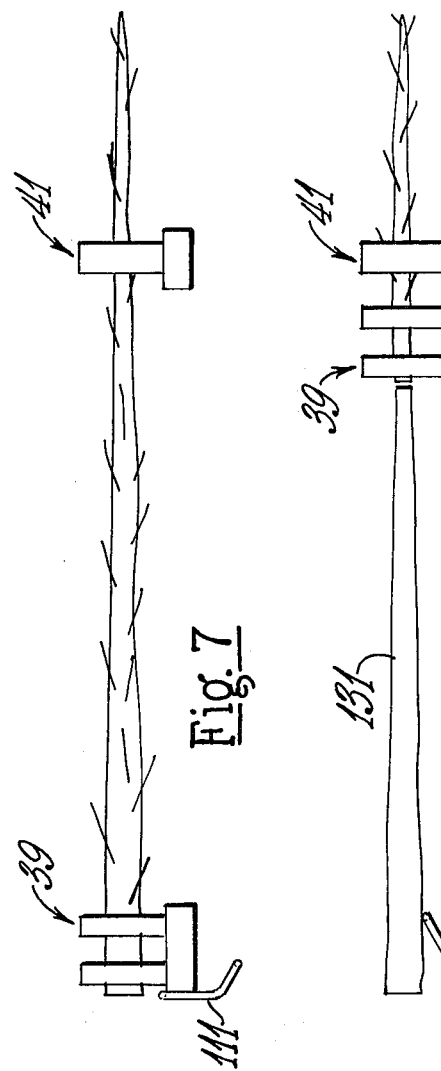

METHOD AND APPARATUS FOR HARVESTING TREES

The present invention relates to an improved method and apparatus for harvesting trees, and more particularly to a method and apparatus capable of efficiently harvesting trees over a wide range of tree sizes.

Heretofore, tree harvesting has been divided into two distinct categories, short wood harvesting and tree length harvesting. In the short wood process trees are sheared, delimbed, and bucked into bolts of a standard length, for example 8 feet, which is considered suitable for further pulpwood operations. In the tree length process trees are sheared, delimbed and topped, and then transported as full tree lengths to another site for further processing.

It has been found, however, that with strict adherence to the short wood or tree length process it is difficult to design a machine which is adaptable to a variety of conditions, such as average tree length, terrain, and location relative to the rest of the pulpwood or lumber operations. Accordingly, while a given machine may be capable of efficient operation in a particular geographic area, it may not be usable in other areas. For example, a harvester which is designed to efficiently harvest trees which average in the 50 foot range will not necessarily be economical to operate in 30 foot stands.

An example of a machine which is designed for a particular range of tree sizes is shown in U.S. Pat. No. 3,894,568. While the harvester disclosed therein has proved to be very successful when operating in stands of a size for which it was primarily designed, and is adaptable to larger trees, it is necessary to alter the normal cycle of the machine in order to accommodate the larger trees, resulting in a loss of efficiency.

Accordingly, the basic object of the present invention is to provide a tree harvesting method and apparatus for processing a wide range of tree sizes at a uniformly high level of efficiency.

Another object of the invention is to provide a method and apparatus for harvesting a processing range of tree sizes which requires a minimum of adaptation on the part of the operator as well as the machine in order to switch from one tree size to another.

Another object of the invention is to provide a tree harvester which is capable of processng more than one tree at a time.

In order to meet the above objectives the present invention provides a method and apparatus which does not adhere strictly to the short wood system nor to the tree length system, but which has attributes of both. Such a harvesting method and apparatus can be conveniently referred to as "log length harvesting."

In order to accommodate trees of varying sizes efficiently the present method and apparatus selects as a standard "log length" bolt a length which is convenient to transport and which lends itself well to machine stability, particularly in the 30 to 50 feet tree length range.

According to the present method a tree is sheared, then felled to a horizontal position; a first section of the tree is then delimbed while the tree is clamped at the butt end, putting the trunk in tension; a bolt of predetermined length is then severed from the trunk and the bolt deposited in a bunk; the remaining section of the tree is them moved into position for another delimbing stroke; at this point the tree is clamped at the top end and a second section is delimbed, this time with the trunk in compression, after which a second bolt of predetermined length is severed. This process is repeated until a minimum acceptable tree diameter is reached, at which time the tree is topped and a random length bolt deposited with the others.

Since the bolt length is selected as a matter of handling convenience rather than a length suitable for other operations away from the machine, stability and other mechanical factors are more readily designed into the machine.

It has been determined that a machine which normally produces a bolt of about 22 feet is well suited to the above objectives. The present invention provides a tree harvester having a stationary, horizontal boom to which a traveling delimbing head and a rearwardly located stationary clamp assembly are attached; and a forwardly located felling head which is capable of shearing a tree at ground level, depositing the tree on the horizontal boom in position to be traversed by the delimbing head, and capable of holding the tree while the delimbing head is moved along the trunk to delimb the tree with the trunk in tension. The delimbing head includes a topping shear which is also used to buck the tree into the selected length bolts, and the delimbing blades are adapted to serve as clamps in order to move the remaining portion of the tree into position to be delimbed, with the butt end at the front of the machine and the top end in position to be clamped by the stationary clamp assembly for additional delimbing strokes with the trunk in compression.

Other objects and advantages of the invention will become more apparent from the following description when taken in connection with the accompanying drawings, wherein:

FIG. 1 is a side elevation view of a tree harvester including apparatus for practicing the method of the present invention;

FIG. 2 is an enlarged end elevation view, with parts cut away, of the stationary clamp assembly of the present invention;

FIG. 3 is an enlarged end elevation view of the delimbing and topping head of the present invention;

FIG. 4 is a fragmentary side elevation view of the forward end of the horizontal boom assembly of the present invention; and FIGS. 5, 6, 7 and 8 are schematic illustrations of the relationships of the various processing elements during the harvesting process of the present invention.

Referring to FIG. 1, a tree harvesting apparatus 11 capable of performing the method of the present invention includes a felling assembly 13 which is operable to sever the trunk of a standing tree and position the felled tree in a processing assembly 15. The processing assembly 15 is mounted on an articulated vehicle 17 having a trailing or rearward end portion 19 which is connected to a front or leading end portion 21 at a pivot connection 23. After the severed tree trunk has been processed by the processing assembly 15, it is deposited in a bunk 25 which is mounted on the front end of the vehicle 17.

The felling assembly 13 includes a felling head 29 having shears 31 for severing the trunk of a standing tree. When a standing tree is to be felled, the felling head 29 is moved to the position shown in dashed lines in FIG. 1. Clamp arms 33 are then closed to grip the tree trunk and the shears 31 are actuated. An articulated boom 35 is then operated from the extended position shown in dashed lines to the retracted position shown in solid lines to position a felled tree trunk 37 (see FIG. 5) in engagement with a delimber head 39 and clamp assembly 41 of the processing assembly 15, as illustrated schematically in FIG. 5. The construction of the felling head 29 and articulated boom 35 are the same as disclosed in U.S. Pat. No. 3,896,862, and the shears 31 and clamp arms 33 are the same as disclosed in U.S. Pat. No. 3,831,647. Accordingly, these features will not be further described herein to avoid prolixity of description.

The processing assembly 15 essentially comprises an elongated, generally horizontal boom assembly 43 rigidly mounted on the leading portion 21 of the articulated vehicle 17 by means of a plurality of upright frame members 45 and diagonal frame members 47; the delimber head 39, which is movable along the boom assembly 43; and the clamp assembly 41, which is fixed to the rearward end of the boom assembly 43.

Referring to FIG. 3, the delimber head 39 is illustrated somewhat schematically. For a more detailed description of a substantially identical delimber head, reference is made to U.S. Pat. No. 3,896,862.

The delimber head 39 includes a plurality of delimber blades 49, 51, 53, 55 and 57. The movable blades 49, 51, 55 and 57 are pivoted from the inactive position shown in FIG. 3 to an active position in contact with a tree trunk by means of a hydraulic cylinder and suitable linkage (not shown) or by other conventional means well known in the art. Also included as part of the delimber head is a topping shear assembly 59 comprising opposed shear blades 61, 63 carried by pivotally mounted frame members 65, 67. A hydraulic cylinder (not shown) acting between the frames closes the blades 61, 63 into shearing engagement with the tree trunk.

The delimber blades and the topping shear frame members and their associated components are mounted on a frame 69 which is supported for movement along the horizontal boom 43 by horizontal rollers 71 and vertical rollers 73 which bear against a channel rail 75 which forms part of the upper portion of the boom assembly 43. It can be appreciated that the illustrated rail and roller arrangement is representative, and that a plurality of similar horizontal and vertical rollers on both sides of the frame 69 are employed to carry the delimber head.

The delimber head 39 can be driven along the boom 43 by any one of several conventional means, for example by a reeved cable and pulley arrangement in combination with a direct-acting hydraulic motor, or by a rack and pinion arrangement. Such arrangements are well known in the art, and the exact system used is not important to the present invention. Suffice it to say that drive means are provided which is capable of moving the delimber head 39 from the position shown in FIGS. 1, 5 and 7 adjacent the forward end of the vehicle, to the position shown in FIGS. 6 and 8 adjacent the clamp assembly 41 at the rearward end of the vehicle. Referring to FIGS. 1 and 2, the clamp assembly 41 comprises first and second end plates 76 and 77 spaced apart by a spacer member 78 at the rear end of the boom assembly 43 and rigidly fastened thereto. Mounted between the end plates is a clamp arm assembly 79 comprising a first clamp arm 81 pivotally mounted between the end plates, a second clamp arm 83 pivotally mounted between the end plates and linked to the first, and a hydraulic actuator 85 connected to the first arm 81.

The upper portion of each of the end plates 75 and 77 is formed into a shallow V-shape to provide a self-centering tree receiving surface 87. Replaceable wear pads 89 can be added to the surface 87.

The first clamp arm 81 is formed with a curved tree engaging surface 91 on its underside, which is adapted to engage trees of varying diameters and clamp them against the surface 87. The first arm also includes an outwardly extending crank arm portion 93 for connection to the hydraulic actuator 85, and is pivotally mounted between the end plates 75, 77 on a pivot pin 95 attached to one or both of the end plates. The second clamp arm 83 is similar in general construction to the first arm, having a curved tree engaging surface 97, and is pivotally mounted on a pivot pin 99. The second arm 83 includes a downwardly extending lever arm 101 for connection to the first arm. A connecting rod 103 is pivotally connected between the first and second arms, as shown, to provide coordinated movement of the arms to clamp a tree against the surface 87. The actuator 85 is a hydraulic cylinder illustratively disclosed with its head end pivotally mounted to one or both of the end plates 75, 77 at 105, and its piston rod 107 pivotally connected to the crank arm 93 of the first arm.

As shown in FIG. 2 the piston rod 107 is extended to rotate the first arm clockwise and, through the connecting rod 103, the second arm counterclockwise into clamping engagement with a tree trunk 37 of relatively small diameter. It can be appreciated that with the piston rod 107 fully retracted the arms will open to release the tree from the receiving surface 87, and that trunks of varying diameters can be clamped by virtue of the shape of the clamp arms 81, 83 and of the receiving surface 87.

Referring to FIGS. 3 and 4, a kicker assembly, designated generally by the numeral 109 is provided to insure that log lengths sheared by the topping shear assembly 59 will fall into the bunk 25, as will be described further.

The kicker assembly comprises a kicker bar 111 pivotally mounted to the forward end of the boom assembly 43 at points 113 and 115 (FIG. 3), and a spring 117 acting between the bar 111 and the boom assembly 43 and normally biasing the bar into the broken line position of FIG. 4. The kicker bar 111 is placed such that it normally interferes with the delimber head 39 as the delimber head approaches its forward-most position. Accordingly, as the delimber head 39 approaches the forward end of the boom it engages a first leg 119 of the bar 111 and urges it toward the solid line position of FIG. 4. Although the end position of the delimber head 39 is controlled by its own mechanism, a positive stop 121 extending from the boom assembly and engaging a second leg 123 of the bar 111 can be provided to prevent inadvertent movement of the kicker bar 111 past the position shown. A second stop 125 controls the rearward position of the bar 111.

Referring to FIG. 3, the bar 111 is in the form of a partial loop having a tree engaging portion 127 overlying the boom assembly 43 and angled downward to help direct processed trees toward the bunk 25, as will be explained.

OPERATION

Referring particularly to FIGS. 5 to 8, a standing tree is clamped and severed close to the ground by the felling head 29 in the broken line position of FIG. 1 and then tilted back to place the severed tree in the position shown schematically in FIG. 5, with the felling head 29 in the full line position of FIG. 1.

In the position shown in FIG. 5 the butt end of the tree 37 is clamped by the felling head 29 and overlies the delimber head 39, while the top end of the tree is supported on the tree receiving surface 87 of the clamp assembly 41. At this point the clamp arm assembly 79 of the clamp 41 is in the open position, and the delimber blades 49, 51, 53, 55, 57 are open. The kicker bar 111 is in its upright position by means of its engagement by the delimber head 39.

Once the tree is positioned as shown in FIG. 5, the delimber blades are closed and the delimber head is moved rightward to a position adjacent the clamp assembly 41, thus putting the tree trunk in tension against the clamping force of the felling head 29. When the delimber head moves to the right the kicker bar 111 is free to move to the broken line position of FIG. 4.

Referring to FIG. 6, when the delimber head 39 reaches a position slightly to the left of that shown adjacent the clamp assembly 41, it is stopped and the topping shear 29 is actuated to cut off a first bolt 129. At the same time increased pressure can be applied to the delimber blades to insure that the top end of the tree is securely clamped thereby. The delimber head 39 is then advanced to the right a slight amount to the position shown, as described in U.S. Pat. No. 3,894,568, to clear the severed bolt. At this time the clamp arms 33 of the felling head 29 are opened and the butt end of the bolt is allowed to drop onto the tree engaging portion 127 of the kicker bar 111 to direct the bolt into the bunk 25.

At this point the felling head is free to be utilized for felling a second tree while operations continue on the first tree.

Referring again to FIG. 6, the top end of the tree 37 is now clamped by the delimber blades and resting loosely on the tree receiving surface 87 of the clamp assembly 41. The delimber head is then returned to the left along the boom 43 to its original position, carrying the tree along with it to the position of FIG. 7. As the delimber head approaches the forward end of the boom 43, it again contacts the kicker bar 111, moving it to the solid line position of FIG. 4, against the force of spring 117.

The clamp arm assembly 79 is then closed by pressurizing hydraulic actuator 85 to close the arms 81, 83 about the tree trunk. The delimbing blades remain closed at this point, but the pressure applied thereto can be reduced from a pressure sufficient to apply a clamping force to a pressure which maintains the blades in contact with the tree trunk for efficient delimbing. The delimber head 39 is then moved to the right along the boom 43, as shown in FIG. 8, to delimb a second log length with the top end of the tree clamped, thus putting the trunk into compression against the clamping force of the clamp arm assembly 79. A second bolt 131 is then sheared off in the same manner as the first bolt.

A comparison of FIGS. 7 and 8 illustrates that the movement of the kicker bar 111 from the solid to the broken line position of FIG. 4 insures that it will be contacted by the second bolt when it is severed in order to direct the second bolt into the bunk 25.

As illustrated herein, the tree 37 is of a length to produce two full log length bolts; however, it can be appreciated that taller trees can be processed by the same apparatus, in which case additional log length bolts are produced by repeating the steps illustrated by FIGS. 7 and 8 wherein delimbing is effected with the trunk in compression. After any full log length is severed, if there is still a usable portion of the tree remaining, but less than a full log length, the delimber head is stopped at some point in its leftward travel along the boom and the last usable length of log is delimbed and severed, generally in the manner of FIGS. 7 and 8. The delimber blades and the clamp arm assembly 79 are then opened fully to allow the top of the tree to fall to the ground. By way of example, the usable portion of a tree is generally considered to be that portion up to the point where the diameter of the tree is less than 3 inches.

After the last bolt is severed, the delimber head 39 is returned to the position of FIG. 5 in preparation to process the next tree deposited by the felling head 29.

I claim:
1. A method of processing trees comprising:
   a. holding the trunk of a felled tree adjacent the butt end thereof;
   b. delimbing a first portion of the trunk, said first portion being defined by said butt end and a first predetermined point along the trunk of the tree;
   c. severing a first bolt defined generally by said butt end and said first predetermined point;
   d. releasing the hold on the trunk adjacent said butt end;
   e. holding the undelimbed portion of the tree at a second predetermined point spaced from the butt end of said portion toward the top end thereof;
   f. delimbing a second portion of the tree trunk, said second portion being defined by the butt end of said portion and a point adjacent said second predetermined point; and
   g. severing a second bolt corresponding generally to the second delimbed portion.

2. A method as claimed in claim 1, including the steps of shearing a standing tree substantially at ground level, and felling said tree to a substantially horizontal position.

3. A method of processing trees comprising:
   a. holding the trunk of a felled tree adjacent the butt end thereof by first gripping means;
   b. delimbing a first portion of the trunk by moving a set of delimbing blades past said trunk in a direction away from said gripping means, said first portion being defined by said butt end and a first predetermined point along the trunk;
   c. severing a first bolt defined generally by the first delimbed portion;
   d. gripping the remaining undelimbed portion of the tree at the butt end of said portion by second gripping means;
   e. moving said undelimbed portion toward said first gripping means to place the butt end of said portion in a position generally corresponding to the starting position of the original butt end;
   f. releasing said second gripping means and regripping said undelimbed portion by third gripping means at a second predetermined point spaced from said butt end;

g. delimbing a second portion of the trunk by moving a set of delimbing blades past said trunk in a direction toward said third gripping means, said second portion being defined by the butt end of said portion and a point adjacent said third gripping means; and h. severing a second bolt corresponding generally to the second delimbed portion.

4. A method as claimed in claim 3, including the steps of butt shearing a standing tree and moving said tree to a substantially horizontal felled position.

5. A method of processing trees comprising:

a. positioning the trunk of a felled tree along an elongated generally horizontal processing boom with the butt end of the tree adjacent a first end of said boom;

b. gripping the butt end of said tree by first gripping means;

c. delimbing a first portion of said tree by moving a delimbing head along said boom toward a predetermined point on said boom spaced from said first end;

d. severing a first bolt from said tree defined generally by said first end and said predetermined point of said boom;

e. gripping the remaining undelimbed portion of the tree at the butt end of said portion by applying a clamping pressure to said delimber head;

f. moving said delimbing head along said boom toward said first end to position the butt end of said undelimbed portion adjacent said first end;

g. releasing said clamping pressure from said delimber head and regripping said undelimbed portion by second gripping means spaced along said boom from said first end;

h. delimbing a second portion of the trunk by moving said delimber head along said boom toward said predetermined point; and i. severing a second bolt defined generally by said first end and said predetermined point on said boom.

6. A method as claimed in claim 5, including the step of butt shearing and felling a standing tree.

7. Apparatus for processing trees comprising: an elongated boom member; means for supporting a tree on said boom member in substantial longitudinal alignment therewith; a first tree clamping member adjacent a first end of said boom member and engageable with a tree supported on said boom member; a delimbing head movable from a point adjacent said first end of said boom member to a first predetermined point along said boom member, said delimbing head being operable to delimb a portion of said tree as it moves along said boom member; means for shearing said tree adjacent said predetermined point to form a first bolt; means for moving the remaining portion of said tree along said boom member toward said first end to a second predetermined point between said first end and said first predetermined point; and a second clamping member on said boom member at a point spaced from said first and second predetermined points, said second clamping member being operable to hold said remaining portion while a second portion of said tree is delimbed and sheared to form a second bolt.

8. Apparatus as claimed in claim 7, in which said delimber head includes a plurality of delimber blades movable into and out of engagement with a tree, and means for selectively operating said delimber blades in a delimbing mode and in a clamping mode, whereby said means for moving said remaining portion of said tree along said boom comprises said delimber head with said delimber blades operated in said clamping mode.

9. Apparatus as claimed in claim 7, in which said second clamping member includes means for supporting a tree on said boom including self-centering means for guiding the tree into alignment with said boom, and at least one clamp arm selectively operable to clamp said tree against said supporting means.

10. Apparatus as claimed in claim 7, including means mounted on said boom member for directing a bolt away from said boom member after said bolt has been sheared.

11. Apparatus as claimed in claim 10, in which said means for directing a bolt comprises an arm member having a tree engaging surface formed thereon mounted on said boom member and movable into position for engagement of said tree engaging surface with a sheared bolt.

12. Apparatus as claimed in claim 11, including means mounting said arm member to said boom member for pivotal movement from a tree engageable position to a position out of the way of a tree overlying said boom member, and means biasing said arm member toward said tree engageable position.

13. Apparatus as claimed in claim 12, in which a portion of said arm member extends into the path of said means for moving said remaining portion of said tree toward said first end when said arm is in its tree engageable position, said moving means engaging said arm member and moving it toward its out of the way position when said moving means is moved toward said first end.

14. Apparatus as claimed in claim 8, in which said arm member comprises an inverted substantially V-shaped member having its free ends journalled in opposite sides of said boom member and its closed end extending above said boom member, said tree engaging surface being angled down and away from said boom member.

15. Apparatus as claimed in claim 7, including felling head means operable to butt shear a standing tree and fell it into position to be supported on said elongated boom member.

* * * * *

UNITED STATES PATENT AND TRADEMARK OFFICE
CERTIFICATE OF CORRECTION

PATENT NO. : 3,952,783
DATED : April 27, 1976
INVENTOR(S) : Robert N. Windsor

It is certified that error appears in the above–identified patent and that said Letters Patent are hereby corrected as shown below:

Col. 1, line 43: "processing" should read --wide--.

line 48: "processing" is misspelled.

Signed and Sealed this

Sixth Day of July 1976

[SEAL]

*Attest:*

RUTH C. MASON
*Attesting Officer*

C. MARSHALL DANN
*Commissioner of Patents and Trademarks*